(12) United States Patent
Blasbalg et al.

(10) Patent No.: US 9,391,413 B2
(45) Date of Patent: Jul. 12, 2016

(54) BUS BAR ARRANGEMENT AND A SHROUD FOR THE SAME

(71) Applicant: ABB Technology AG, Zurich (CH)

(72) Inventors: Paul Blasbalg, Barrington, RI (US); Lyoji Jesus Yamaguchi, San Luis Potosi (MX)

(73) Assignee: ABB TECHNOLOGY AG, Zurich (CH)

( * ) Notice: Subject to any disclaimer, the term of this patent is extended or adjusted under 35 U.S.C. 154(b) by 0 days.

(21) Appl. No.: 14/254,538

(22) Filed: Apr. 16, 2014

(65) Prior Publication Data

US 2014/0315401 A1    Oct. 23, 2014

Related U.S. Application Data

(60) Provisional application No. 61/815,078, filed on Apr. 23, 2013.

(51) Int. Cl.
| | | |
|---|---|---|
| *H01R 25/00* | (2006.01) | |
| *H01R 25/16* | (2006.01) | |
| *H01B 17/56* | (2006.01) | |
| *H02B 1/056* | (2006.01) | |
| *H02B 1/06* | (2006.01) | |
| *H02B 1/21* | (2006.01) | |
| *H02G 5/06* | (2006.01) | |
| *H02G 5/10* | (2006.01) | |

(52) U.S. Cl.
CPC .............. *H01R 25/161* (2013.01); *H01B 17/56* (2013.01); *H02B 1/056* (2013.01); *H02B 1/06* (2013.01); *H02B 1/21* (2013.01); *H02G 5/06* (2013.01); *H02G 5/10* (2013.01)

(58) Field of Classification Search
CPC ...... H01R 25/16; H01R 25/161; H01B 17/56; H02B 1/21; H02B 1/06
USPC .......................................................... 439/110
See application file for complete search history.

(56) References Cited

U.S. PATENT DOCUMENTS

| | | | |
|---|---|---|---|
| 3,113,820 A | | 12/1963 | Norden |
| 4,142,225 A | * | 2/1979 | Diersing et al. .............. 361/647 |

(Continued)

FOREIGN PATENT DOCUMENTS

| | | |
|---|---|---|
| DE | 29810323 U1 | 9/1998 |
| EP | 2461440 A2 | 6/2012 |

(Continued)

OTHER PUBLICATIONS

European Patent Office, International Search Report, WO PCT /US2014/034511 having a mail date of Jul. 18, 2014 in U.S. Appl. No. 14/254,538, Paul Blasbalg et al.

*Primary Examiner* — Jean F Duverne
(74) *Attorney, Agent, or Firm* — Taft Stettinius & Hollister LLP

(57) ABSTRACT

A bus bar arrangement for electrical equipment has at least one bus bar and a shroud. The shroud provides a fault free interface for personnel working with the electrical equipment. First and second shrouds mounted on opposing ends of the at least one bus bar surround a substantial portion of the at least one bus bar. The shroud provides a connection surface for the connection of a wide variety of circuit breakers thereon. The shroud provides protection against intruding objects and ease of connection between circuit breaker contacts and bus bar assemblies of electrical equipment.

17 Claims, 13 Drawing Sheets

(56) References Cited

U.S. PATENT DOCUMENTS

| | | | |
|---|---|---|---|
| 4,178,624 A * | 12/1979 | Wilson et al. | 361/611 |
| 4,358,815 A * | 11/1982 | Koslosky et al. | 361/640 |
| 4,366,528 A * | 12/1982 | Cole | 361/831 |
| 4,528,614 A * | 7/1985 | Shariff et al. | 361/678 |
| 4,768,967 A | 9/1988 | Fritsch | |
| 5,166,861 A | 11/1992 | Krom | |
| 5,315,477 A * | 5/1994 | Schumacher et al. | 361/678 |
| 5,574,251 A * | 11/1996 | Sevier | 174/50 |
| 5,767,440 A * | 6/1998 | Byron et al. | 174/17 VA |
| 5,894,405 A | 4/1999 | Fleege et al. | |
| 6,205,019 B1 | 3/2001 | Krom | |
| 6,270,361 B1 * | 8/2001 | Onizuka | H01R 9/226 439/76.2 |
| 6,781,818 B2 * | 8/2004 | Josten et al. | 361/611 |
| 7,633,741 B2 * | 12/2009 | Hughes et al. | 361/611 |
| 8,134,070 B2 * | 3/2012 | Hirschfeld | 174/72 B |
| 8,270,167 B2 * | 9/2012 | Greenwood et al. | 361/704 |
| 8,625,257 B2 | 1/2014 | Schalk et al. | |
| 9,007,746 B2 * | 4/2015 | Rajvanshi et al. | 361/678 |

FOREIGN PATENT DOCUMENTS

| | | |
|---|---|---|
| FR | 1339926 A | 10/1963 |
| GB | 2351852 A | 1/2001 |

* cited by examiner

BUS BAR ARRANGEMENT AND A SHROUD FOR THE SAME

FIELD OF INVENTION

The present application is directed to a bus bar arrangement used in low-voltage electrical equipment, and more particularly to safety features integrated with the bus bar arrangement.

BACKGROUND

Panelboards, switchboards, switchgear, power distribution units and other types of electrical equipment have safety standards for personnel working in and around the electrical equipment, such as ingress protection ratings under international standard IEC 60529. The ingress protection ratings, and more particularly the IP2X ratings, are directed to the prevention of the intrusion of objects such as tools or human fingers into the live connections of the electrical equipment. While the safety standards provide guidelines for safe operation and maintenance of electrical equipment, they do not provide a means for designing, producing and commissioning electrical equipment to achieve the safety guidelines.

SUMMARY

An object of the present disclosure is to provide a fault-free zone at the interface between the circuit breakers and the bus bar stack and electrical equipment incorporating the fault-free zone. The fault-free zone provides protection for personnel working in and around the electrical equipment from electrical shock.

Another object of the present disclosure is to provide electrical equipment having a bus bar arrangement with the flexibility to support the connection of a wide variety of branch circuit breakers.

Yet another object of the present disclosure is to provide ease of connection between circuit breaker contacts and bus bar assemblies of electrical equipment.

BRIEF DESCRIPTION OF THE DRAWINGS

In the accompanying drawings, structural embodiments are illustrated that, together with the detailed description provided below, describe exemplary embodiments of a bus bar arrangement and shroud for the same. One of ordinary skill in the art will appreciate that a component may be designed as multiple components or that multiple components may be designed as a single component.

Further, in the accompanying drawings and description that follow, like parts are indicated throughout the drawings and written description with the same reference numerals, respectively. The figures are not drawn to scale and the proportions of certain parts have been exaggerated for convenience of illustration.

DETAILED DESCRIPTION

Figure 1:
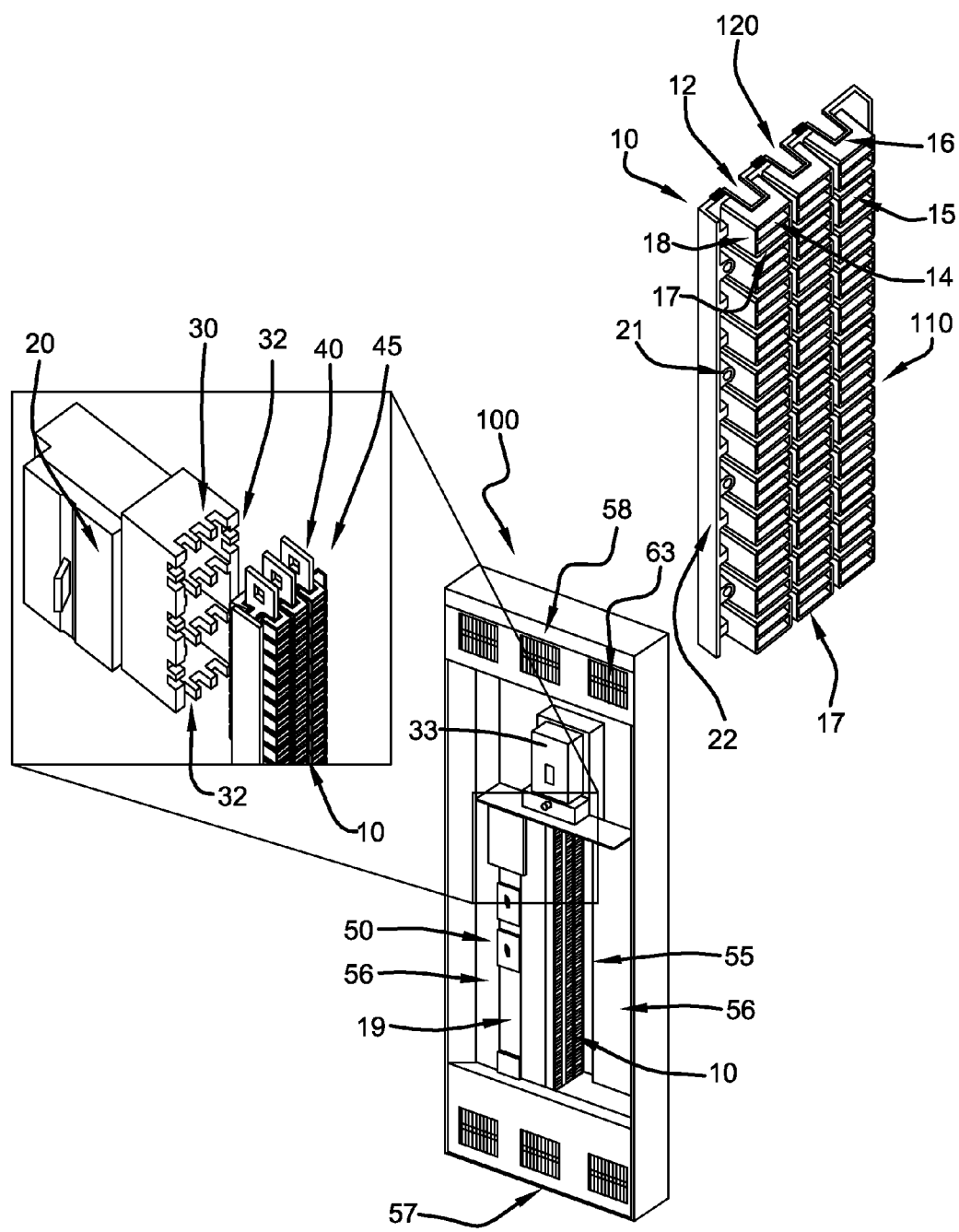
FIG. 1 is an exemplary panelboard having a bus bar arrangement and a shroud embodied in accordance with the present invention.

With reference to FIG. 1, exemplary electrical equipment 100 having a bus bar arrangement of a bus bar assembly 45 and a shroud 10 is shown. While an exemplary panelboard 100 is shown, it should be appreciated that the bus bar assembly 45 and shroud 10 can be used in low-voltage panelboards, switchboards, switchgear, power distribution units, applications that utilize single- and group-mounted molded case circuit breakers (hereinafter "MCCB") and any other suitable electrical application. Low voltage, as used herein, refers to voltages that do not exceed 600 volts.

With continued reference to FIG. 1, the panelboard 100 has an enclosure 125, a bus bar assembly 45, and a shroud 10. The enclosure 125 of the panelboard has top 58, bottom 57, side 56, front (not shown), and rear 50 walls. Mounted vertically in the enclosure 125 is the bus bar assembly 45 as is shown in the inset of FIG. 1. The bus bar assembly 45 has at least one bus bar 40. In one embodiment, each bus bar of the at least one bus bar 40 is separated from adjacent ones of the at least one bus bar 40 by about 30.15 mm. In the embodiment shown in FIG. 5, the bus bar assembly 45 has three bus bars and three spacers 60, the spacers 60 providing the separation between adjacent ones of the at least one bus bar 40.

The bus bar assembly 45 has a shroud 10 surrounding first and second end portions of the at least one bus bar 40. The shroud 10 is formed of a network of connected and spaced-apart recesses 15 for receiving electrical contacts 116 and teeth 32 of an adapter portion 30 of a circuit breaker 20. One example of a circuit breaker 20 for use with the bus bar assembly 45 is the Tmax XT circuit breaker, available from the assignee of the present application.

The shroud 10 is formed from Nylon 6,6, (also known as polyamide 66) in an injection molding process. In the well-known injection molding process, nylon 6,6 in pellet form is fed into a heated barrel, mixed, and forced into a mold cavity. The mold cavity has the shape of the shroud 10 and the material cools and hardens to the configuration of the cavity.

Figure 2:
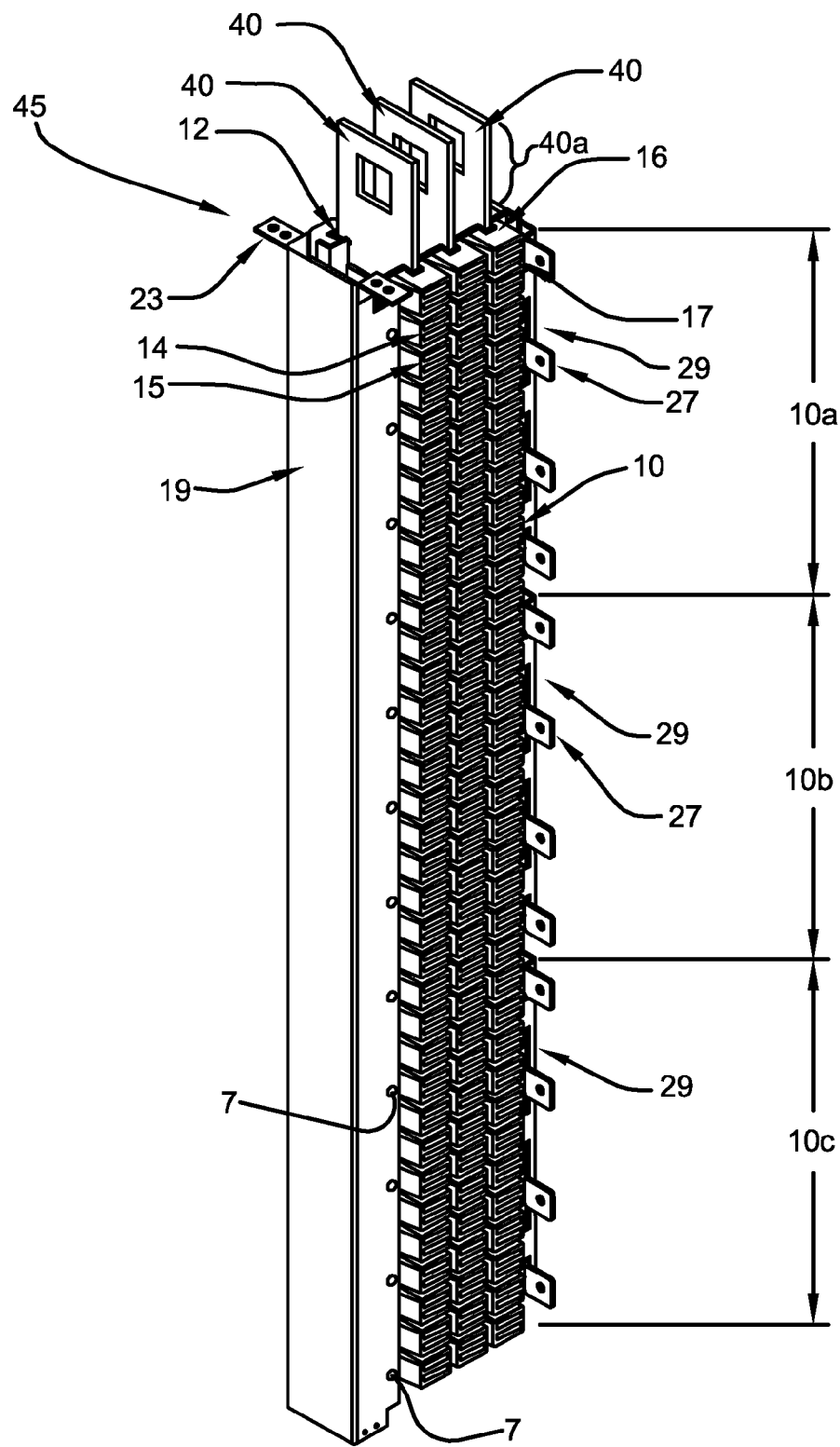
FIG. 2 is a perspective view of the bus bar assembly.

The shroud 10 may be embodied as multiple rows of recesses 15 by one column of recesses 15 in a single phase embodiment. However, as depicted in FIGS. 1 and 2, multiple rows of recesses 15 by three columns of recesses 15 or any number of rows and columns of recesses 15 suitable for the application and corresponding number of phases of the electrical system are utilized. Each of the recesses 15 has a top edge 16, bottom edge 17, side edges 18, a partition 14 and a beveled portion 115.

There is about 27 mm of modularity as measured from a top edge 16 of the recess 15 to the top edge 16 of an adjacent recess 15 or as measured from a partition 14 of the recess 15 to the partition 14 of an adjacent recess 15 above or below the recess 15 of interest. The modularity is for the ease of connection of circuit breaker contacts 116 through the shroud 10 to the connection surface 135 of the corresponding at least one bus bar 40. In one embodiment, there is about 32 mm of modularity as measured from a top edge 16 of the recess 15 to a top edge 16 of the recess 15 immediately above or below.

Figure 9:
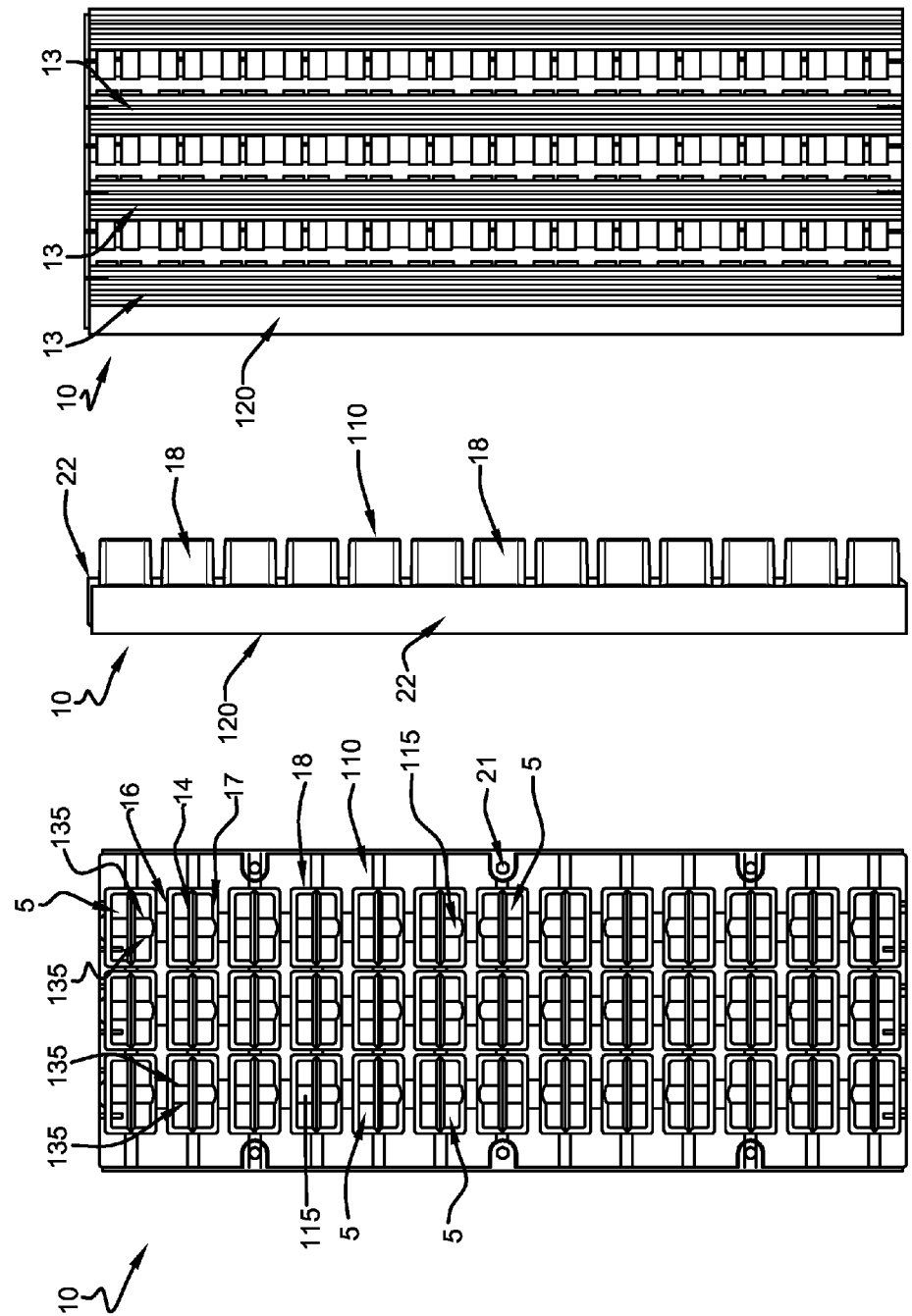
FIG. 9A is a front view of the shroud.
FIG. 9B is a side view of the shroud.
FIG. 9C is a rear view of the shroud.

In one embodiment, the depth of each recess 15 is about 18 mm. It should be understood that the depth varies depending on the application. The depth of each recess 15 is measured from a top planar surface of each recess to the connection surface 135 of the corresponding at least one bus bar 40. A horizontal partition 14 is disposed at the midpoint of each recess 15. Each recess 15 has cells 5 formed therein by the partition 14 and a vertical beveled portion 115 as depicted in FIG. 9A. Two adjacent cells 5 may cooperate to form a connection surface 135 for the circuit breaker contacts 116.

The beveled portion 115 is not flush with a top planar surface of the shroud 10 and is disposed about 14.5 mm below the top planar surface of the shroud 10. In one embodiment, the beveled portion 115 is disposed more than 14.5 mm below the top planar surface of the shroud 10, although it should be understood that the measurements provided are exemplary, and depend on the application. The beveled portion 115 in is in contact with the first and second ends 47, 49 of the at least one bus bar 40 in an arrangement utilizing two shrouds 10, 10'. In one embodiment, the beveled portion 115 of the shroud 10 is about 4.5 mm in thickness. In that same embodiment, the at least one bus bar first or second end 47, 49 is about 19 mm below the top planar surface of the corresponding shroud 10 recess 15.

The shroud has a first side 110 and a second side 120. The first side 110 has a network of spaced-apart recesses 15 that provide a connection surface 135 for contacts 116 of one or more circuit breakers 20. The second side 120 of the shroud 10 has a plurality of slots 12 that extend vertically along the length of the shroud for receiving corresponding end portions of the at least one bus bar 40. The shroud 10 encloses the at least one bus bar 40 end surface 47 except for the connection surface 135.

In an embodiment utilizing first and second shrouds 10, 10' the first and second shrouds surround a substantial portion of first and second ends 47, 49 of the at least one bus bar 40, respectively, and provide a connection surface 135 for one or more circuit breakers 20. Substantial, as used herein, means at least eighty percent of the surface area of the at least one bus bar is enclosed by the shroud 10 when first and second shrouds 10, 10' are utilized. In one embodiment, the shroud 10 encloses ninety-five percent of the surface area of the at least one bus bar 40. The second shroud 10' is a mirror image of the first shroud 10.

In one embodiment, the bus bar assembly 45 has at least one bus bar 40 that is spaced apart about 36.5 mm from adjacent or neighboring ones of the at least one bus bar 40. The bus bar assembly 45 is surrounded by the shroud 10. The shroud 10 encloses a substantial portion of the at least one bus bar 40 except for the connection surface and the top portion 40a of the bus bars. The top portion 40a of the at least one bus bar extends outside of the shroud 10 when the bus bar assembly is vertically mounted, as depicted in FIGS. 1 and 2. The top portion 41 of the bus bar is used to make connections to a main circuit breaker and/or lugs.

The top portion of the bus bar 40a, main circuit breaker and lug connections are housed in a mains compartment 33, so that only the connection surface of the at least one bus bar 40 is accessible when the first and second shrouds 10, 10' are installed on the bus bar assembly 45.

Figure 4:
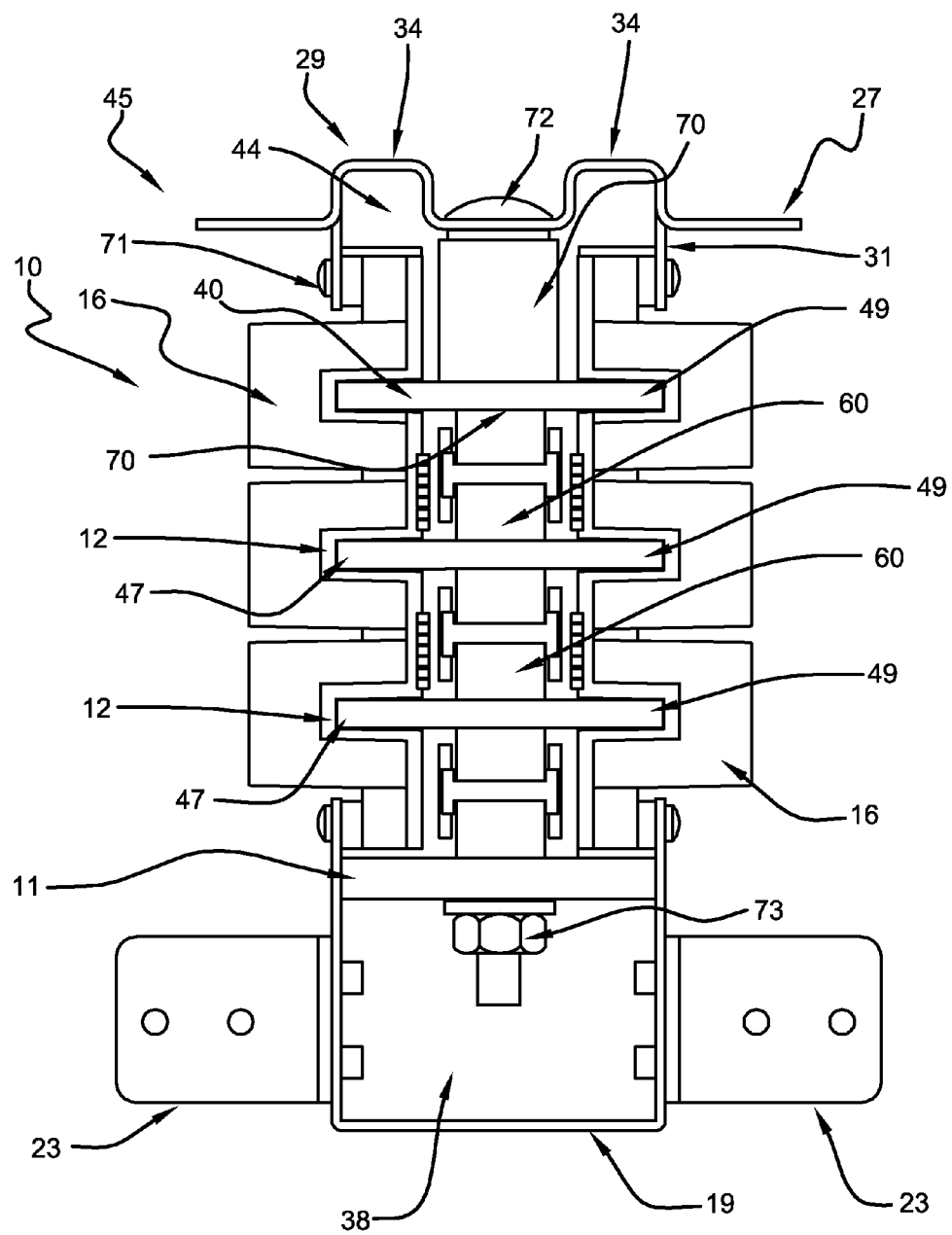
FIG. 4 is a top view of a first exemplary arrangement of the bus bar assembly having the shroud.
Figure 5:
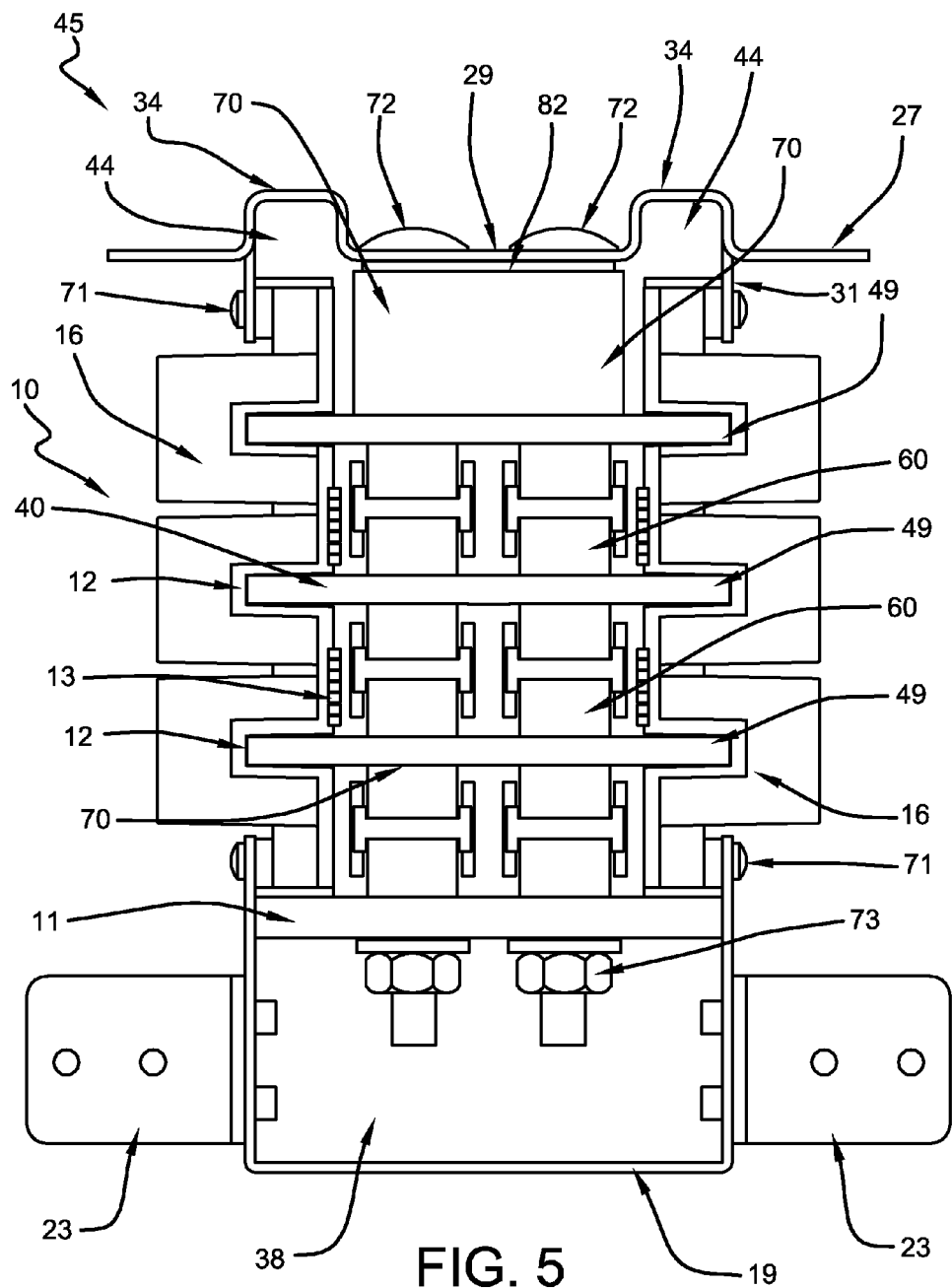
FIG. 5 is a top view of a second exemplary arrangement of the bus bar assembly having the shroud.

The design of the shroud 10 provides additional creepage distance between adjacent ones of the at least one bus bar 40 by increasing the surface area between adjacent ones of the at least one bus bar 40. With reference to FIGS. 4, 5, and 9c, the surface area provided by ribs 13 that are arranged and disposed vertically along the second side 120 of the shroud is about 14 mm. In one embodiment, the result is that the at least one bus bar 40 has a total creepage distance of about 50 mm as measured between adjacent ones of the at least one bus bar 40 owing to the added surface area provided by the ribs 13.

It should be understood that other bus bar arrangements 45 are possible for a single-phase or another type of poly-phase power system. In one embodiment, the panelboard 100 also has a neutral bar and/or a grounding bar.

It should be appreciated that the panelboard or other electrical equipment having the bus bar arrangement 45 may contain active or live electrical connections. Therefore, it is desirable to prevent intruding objects, such as fingers or wires for example, from coming into contact with the live connections. The ingress protection (IP) is defined by international standard IEC 60529 for various application or protection ratings.

In the case of panelboards, switchboards, switchgear or similar applications, it is desirable to achieve an IP2X rating, meaning that solid and/or intruding objects greater than 12 mm in diameter, such as human fingers, are prevented from accessing live electrical components. The shroud 10 provides IP2X protection to personnel working in and around the electrical equipment utilizing the shroud 10. The shroud 10 provides a fault-free interface for connection of circuit breakers 20 to the at least one bus bar 40 of the bus bar arrangement 45. More particularly, the fault-free zone extends from the at least one bus bar 40 of the bus bar assembly 45 to the end surface of the shroud 10 farthest from the bus bar assembly 45 and continues to the power contacts 116 of the branch circuit breaker 20 when the circuit breaker is mounted to the bus bar assembly 45 through the shroud 10.

Further, the bus bar assembly 45 meets the UL 67 standard of an "insulated bus" without requiring any additional insulation on the individual ones of the at least one bus bar 40 above the protection offered by the shroud 10. Therefore, the shroud 10 insulates and isolates each of the at least one bus bar 40 from adjacent ones of the at least one bus bar 40.

A flange 22 extends outward from the base of the side edges 18. The flange 22 has openings for receiving fasteners 71. First and second shrouds 10, 10' are placed on opposing sides of the bus bar assembly 45 with each of the at least one bus bar 40 positioned in the corresponding slot 12. The first and second shrouds 10, 10' are connected together by placing fasteners 71 through the corresponding openings 21 of the flanges 22. The connection of the shrouds 10 is secured using nuts and/or washers 73.

In an exemplary arrangement, there are three of the at least one bus bar 40 arranged in a bus bar assembly 45 and surrounded by first and second shrouds 10, 10' as shown in FIGS. 4 and 5 which will be discussed in further detail later. The bus bar assembly 45 is arranged vertically. The at least one bus bar 40 has a generally rectangular shape, and each shroud 10 surrounds corresponding first and second end portions 47, 49 of the at least one bus bar 40 of the bus bar assembly 45.

The bus bar assembly 45 having first and second shrouds 10, 10' is designed to be separately provided as a unit. Alternatively, the bus bar assembly 45 may be provided in an enclosure 125 and embodying the electrical equipment previously mentioned. The shroud 10, as an article of manufacture, may be distributed alone for use in electrical equipment or as a replacement part.

Referring now to FIG. 2, the bus bar assembly 45 is arranged vertically and is mounted to rear wall 50 of the enclosure 125 using mounting brackets 29. The bus bar assembly 45 is secured to an inside surface of the top wall. In the exemplary arrangement of FIG. 2, three shrouds 10a, 10b, 10c enclose the first end portions 47 of the bus bar assembly 45. The three shrouds 10a, 10b, 10c are arranged vertically on opposing sides of the bus bar assembly 45. The end portions 47 of the at least one bus bar 40 of the bus bar assembly 45 fit into the corresponding slots 12 of the shrouds 10.

The shrouds 10 on the front and rear sides of the bus bar assembly 45 each have three sections, 10a, 10b, 10c. It should be understood that any number of shrouds 10 including a single shroud 10 placed on each opposing side of the bus bar assembly 45, can be utilized to carry out the present disclosure.

Figure 3:
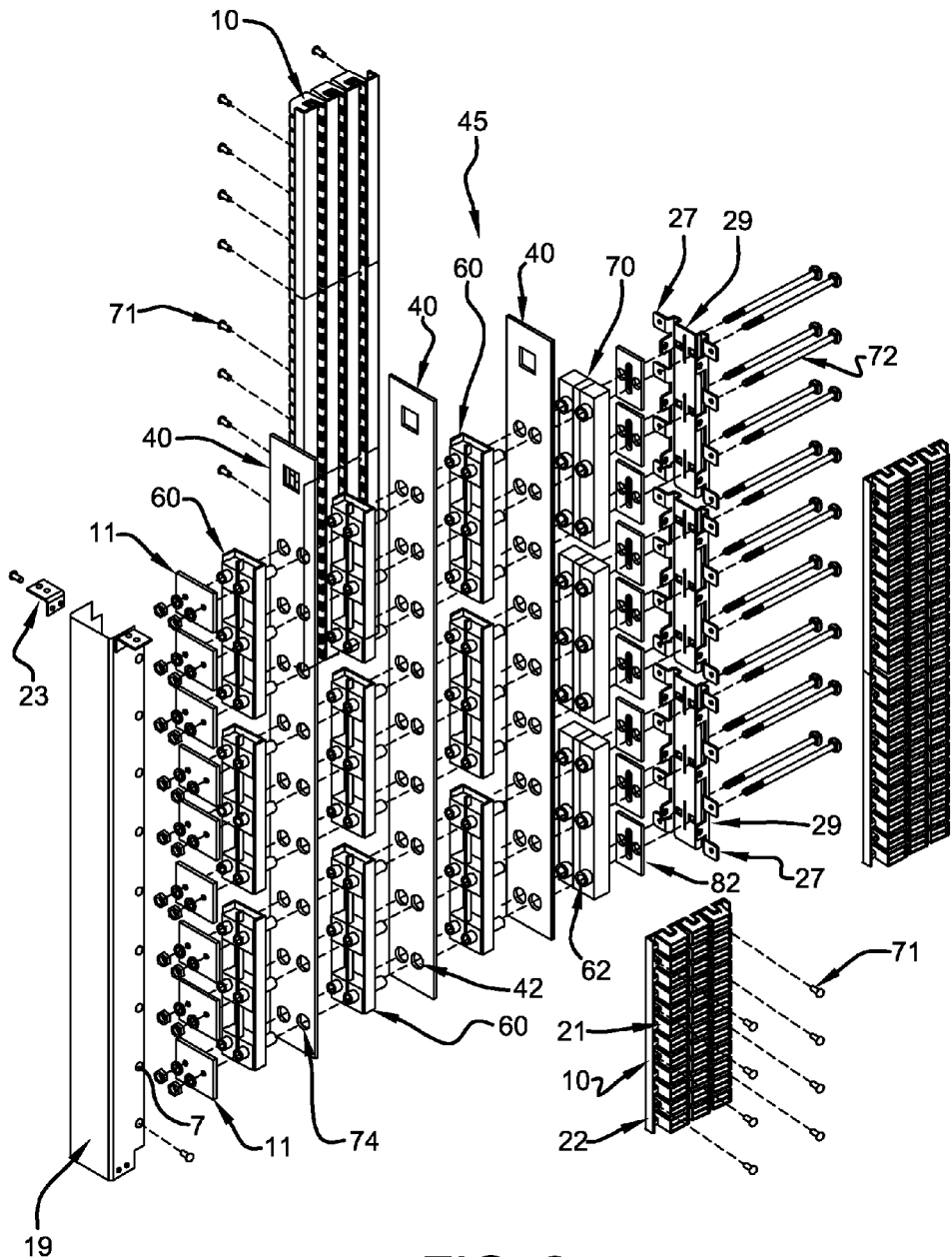
FIG. 3 is an exploded view of the bus bar assembly.

With reference to FIG. 3, an exploded view of the bus bar assembly 45 of the panelboard 100 is shown. Moving from left to right, a cover plate 19, insulating plates 11, spacers 60, at least one bus bar 40, insulating plates 82 and mounting plates 29 are shown. FIG. 3 shows the manner in which the bus bar assembly 45, cover plate 19, mounting plate 29, insulation plate 11, and spacers 60 are connected together using elongated fasteners 72 that run laterally through the stacked arrangement of the at least one bus bar 40 and corresponding spacers 60. Fasteners 71 connect the first shroud 10 with the second shroud through openings 7, 31a, 21 in the cover plate 19, mounting plate 29 and shroud flanges 22, respectively. The gap 38 between the cover plate 19 and the insulating plates 11 provides a ventilation path along the vertical surface of the bus bar assembly.

Figure 13A:
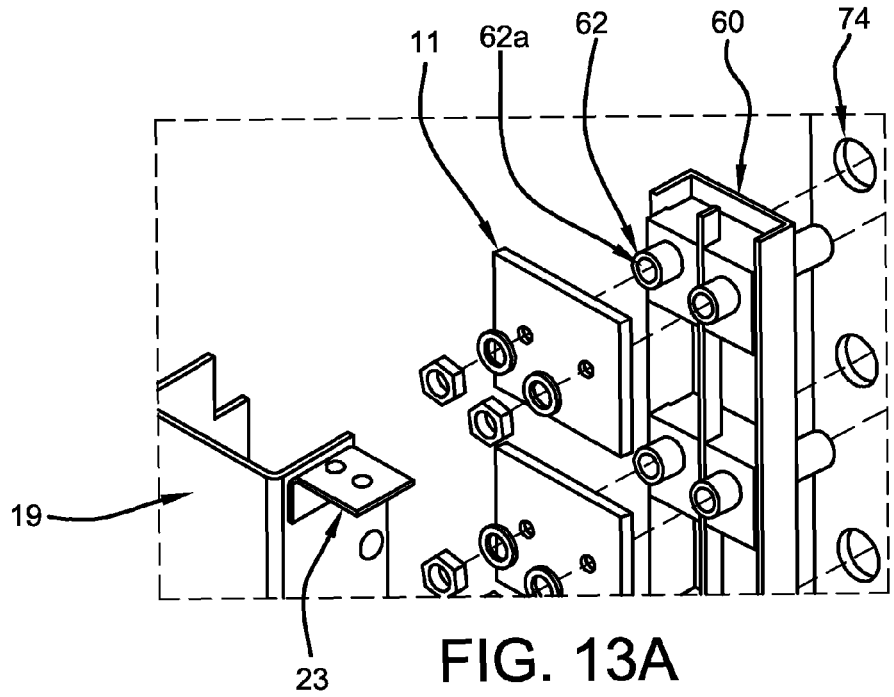
FIG. 13A is an exploded view of a front portion of the bus bar assembly.

With continued reference to FIG. 3, the bus bar stack 45 is constructed by placing mounting plate 29 against the rear wall 55 of the enclosure 125 with first tabs 27 of mounting plate 29 extending outwardly from the body 39 of the mounting plate 29. Elongated fasteners 72 are placed through apertures (not shown) in the rear wall and openings 25 in the mounting plate 29. As shown in FIG. 13A, the cover plate 19 has ears 23 that allow for the attachment of the cover plate 19 to the bottom of the mains compartment 33 to further secure the bus bar assembly 45 to the enclosure.

With continued reference to FIG. 3, a set of spacers 60 are placed over the ends of elongated fasteners 72. In one embodiment, there are three sets of spacers 60, with each set of spacers 60 located between each layer of successively stacked mounting plates 19, 29 and/or at least one bus bar 40. It should be understood that depending on the configuration and output rating of the electrical equipment, one spacer 60, three spacers 60, or any number of spacers 60 may be used between successive ones of the at least one bus bar 40 and/or mounting plates 19, 29.

After the mounting plate 29, set of spacers 60 and the back plate 55 are connected together, the at least one bus bar 40 is placed over the raised edges 62 of the spacers 60. Another set of spacers 60 are placed over the at least one bus bar 40, and then in an alternating fashion another one of the at least one bus bar 40 and a corresponding set of spacers 60 are arranged. In a three-phase system, another one of the at least one bus bar 40 is placed over the set of spacers 60 to form the bus bar assembly 45.

The insulating plates 11 are then arranged over the final at least one bus bar 40 in the stack or similar arrangement and the bus bar assembly 45 is secured by placing nuts and/or washers 73 over the corresponding ends of the elongated fasteners 72. Mounting plates 19, 29 are secured over the opposing ends of the bus bar assembly 45 using fasteners 71 that connect corresponding ones of the shrouds 10 together.

The spacers 60 are formed of glass-reinforced polyester resin using a pultrusion process. In the pultrusion process, the glass fibers are drawn through one or more baths of the thermosetting polyester resin and are then pulled through a heated die where the thermoset resin is cured. The fibers may be aligned as either unidirectional roving or a multi-directional mat. Alternatively, the spacers 60 are formed using a suitable polymeric material in an injection molding process.

The spacers 60 have a plurality of openings that extend as through-holes between the opposing sides of each spacer 60. Although the plurality of openings 62a is depicted as six openings per spacer 60, however, it should be understood that a different number of openings can be utilized to connect the spacers 60 to the corresponding at least one bus bar 40, cover plate 19, mounting plates 29 and insulation plates 11. Each of the plurality of openings 62a has raised edges 62 that extend from the surfaces 70 of opposing sides of the spacer 60. The raised edges allow the spacers 60 to seat into the corresponding openings 25, 42, 74 of the mounting plate 29, bus bars 40, and insulation plates 11, 82.

The insulation plates 11, 82 are formed of a sheet of polyester fiberglass, otherwise known as GPO-3. The polyester fiberglass mat is formed of random mat (non-woven) fiberglass reinforcement held together by a polyester resin binder. The insulation plates 11, 82 have openings for receiving fasteners 72. Insulation plate 82 has a vent 85 formed therein that lines up with a vent 35 in the mounting plate 29. There are several insulation plates 11, 82 on each side of the bus bar assembly 45. The insulation plates 11, 82 are spaced apart from neighboring insulation plates 11, 82 so as to provide ventilation between adjacent plates. Further the mounting plates 29 are also arranged so that space is provided between adjacent mounting plates 29 for ventilation.

Referring now to FIGS. 4 and 5, a top view of the bus bar arrangement 45 is depicted for smaller and large output ratings, respectively. The larger output rating design is shown in FIG. 5 having the at least one bus bar 40 having a greater width and an additional set of spacers 60 in comparison to the design shown in FIG. 4. The shroud 10 has slots 12 for engaging corresponding ones of the end surfaces of the bus bars 40 of the bus bar arrangement 45 and ribs 13 that extend along the vertical length of the shroud.

Figure 6:
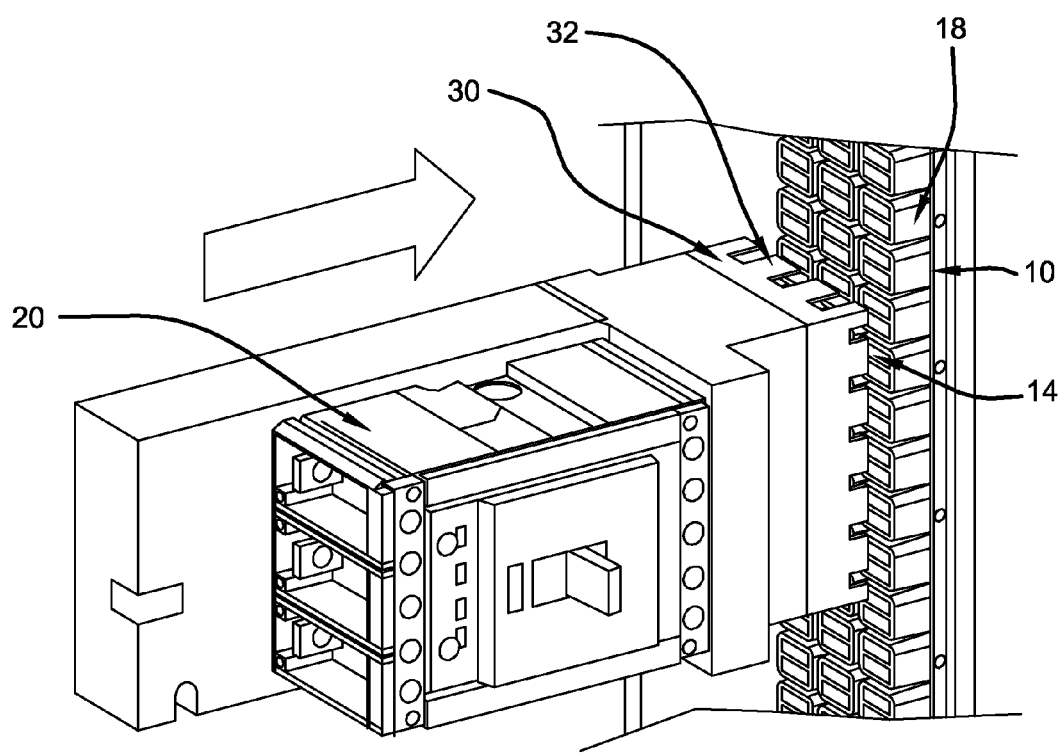
FIG. 6 is a perspective view of an exemplary circuit breaker prior to connection through the shroud to the bus bar assembly.
Figure 7:
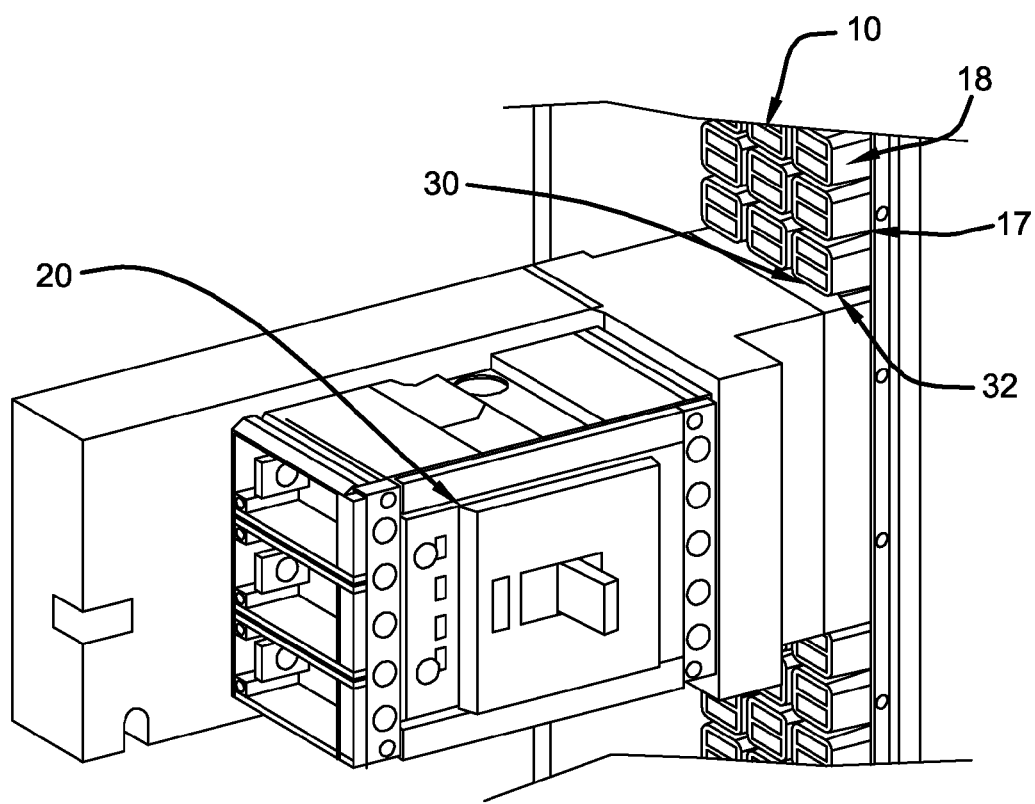
FIG. 7 is a perspective view of the exemplary circuit breaker connected with through the shroud to the bus bar assembly.

With reference now to FIG. 6, an exemplary MCCB 20 is shown prior to connection with the bus bar arrangement 45 through the shroud 10. The teeth 32 of an adapter portion 30 of the MCCB 20 engage with the corresponding top, bottom and side edges 16, 17, 18 of the recesses 15 as is shown in FIG. 7.

Figure 8:
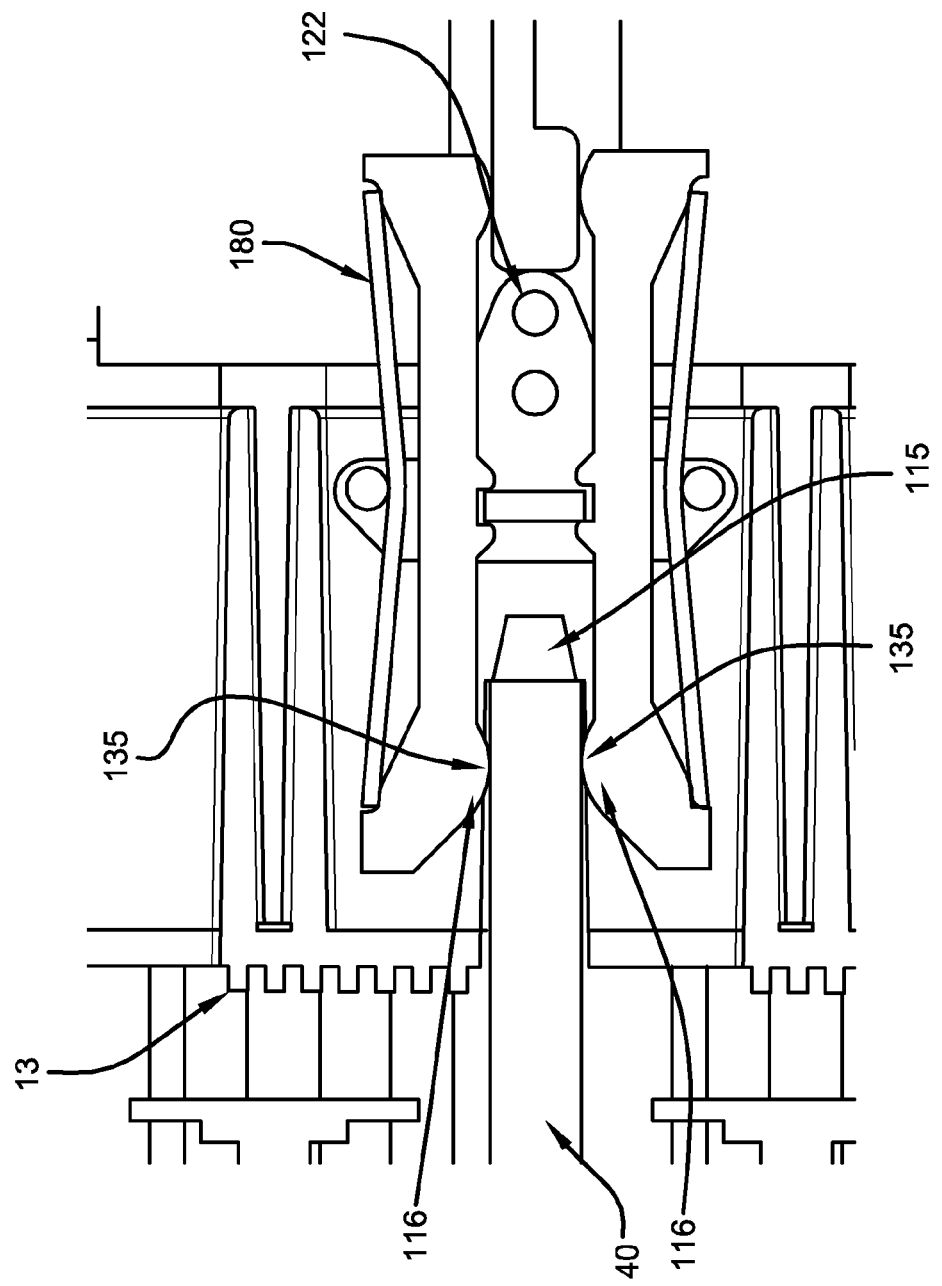
FIG. 8 is a schematic of a contact of the exemplary circuit breaker in connection with one of the bus bars of the bus bar assembly through the shroud.

With reference to FIG. 8, contacts of the circuit breaker 20 are shown in connection to a corresponding one of the at least one bus bar 40 of the bus bar assembly 45. The circuit breaker 20 contacts 116 connect with the corresponding one of at least one bus bar 40 of the bus bar assembly 40 through corresponding apertures 135 in the shroud 10.

The circuit breakers 20 are installed onto the at least one bus bar 40 or bus bar assembly 45 using manual or automatic installation wherein the circuit breaker 20 is pushed onto the shroud 10. During installation of the circuit breaker 20 upon the shroud 10, the circuit breaker 20 is moved in a straight line until the contact ends 116 are pushed or forced over the beveled portion 115 formed in the recess 15. The force applied during manual or automatic installation of the circuit breaker 20 causes the spring-loaded contacts 116 to open. The contacts 116 are guided by the beveled portion 115 onto the connection surface 135 of the at least one bus bar 40.

With continued reference to FIG. 8, the contact stem 180 of the circuit breaker 20 is spring-loaded 122 to allow the contacts 116 to be pushed over the exposed bus bar surface. The exposed bus bar surface of the connection surface 135 is large enough in diameter and/or shaped to allow mating between the contacts 116 and the corresponding at least one bus bar 40 while still preventing access by objects longer than 12 mm such as tools or human fingers.

Referring now to FIGS. 9a, 9b, and 9c, front, side, and rear views of the shroud 10, respectively, are depicted. The first side 110 of the shroud 10 provides the fault-free connection surface 135 for connecting circuit breakers 20 to the bus bar arrangement 45. The side view shows the flange 22 of the shroud 10 used for connecting first and second shrouds 10 together. The side view also shows side edges 18 of the recesses 15. The rear view depicts the ribs 13 that extend vertically along the second side 120 of the shroud 10. The ribs 13 extend outwardly from the surface of the second side 120 of the shroud 10.

Figure 10:
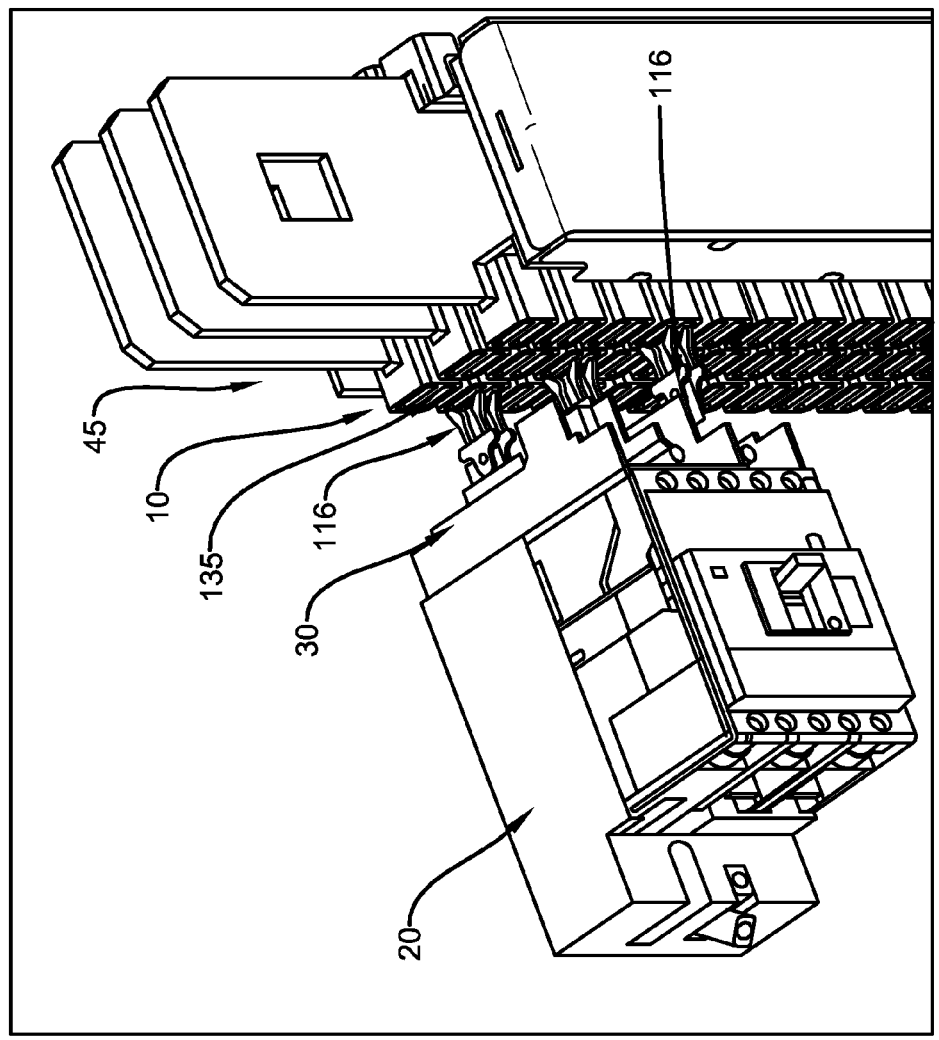
FIG. 10 is a perspective view of a circuit breaker having a portion of an adapter removed to show the contacts prior to connection with the shroud and bus bar assembly.

With reference now to FIG. 10, the exemplary MCCB 20 is shown prior to connection with the connection surface 135 of the corresponding recesses 15. The exemplary MCCB 20 has three contacts 116 which when fully engaged with the shroud 10, each connect to the corresponding connection surface 135 housed in a recess 15 of the shroud 10.

Figure 11:
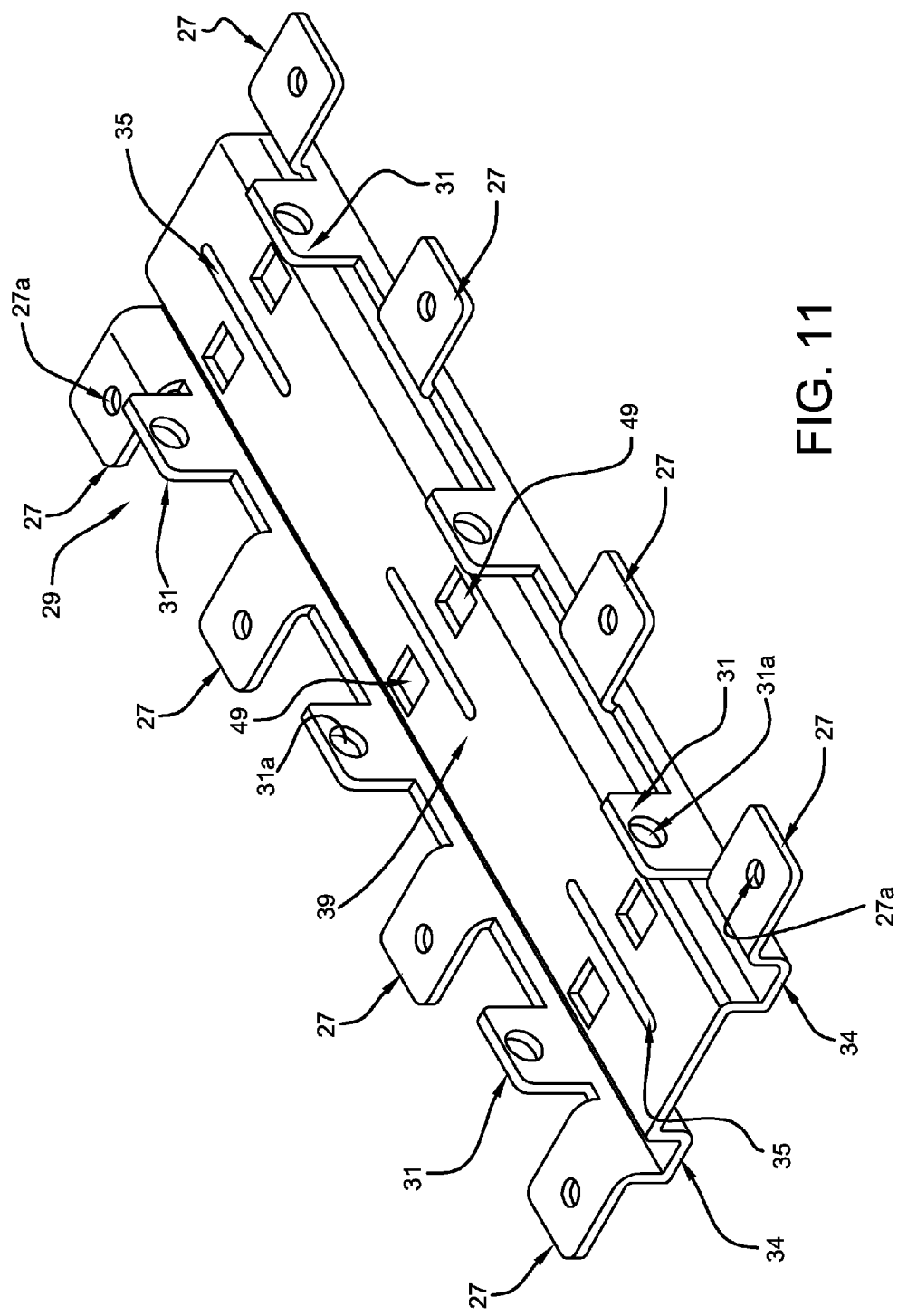
FIG. 11 is a perspective view of a mounting bracket.
Figure 13B:
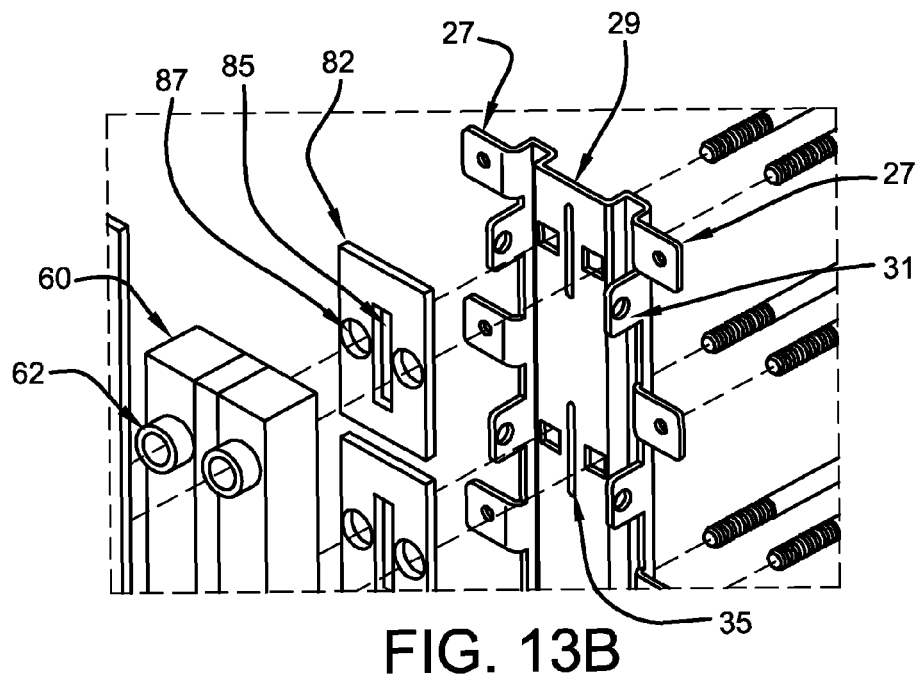
FIG. 13B is an exploded view of a rear portion of the bus bar assembly.

With reference now to FIGS. 11 and 13b, the mounting plate 29 has a body 39 having first tabs 27 extending outward therefrom and channels 34 formed therein. The tabs 27 attach to the rear wall of the enclosure 125 using fasteners 72 placed through openings 27a in the first tabs 27. The body 39 has second tabs 31 that extend forward and have openings 31a corresponding to the openings 21 of the shroud flanges 22. The channels 34 extend longitudinally along the body 39 and provide ventilation passages 44 between the back wall of the enclosure 125 and the mounting plate 29 when the mounting plate 29 is mounted to the enclosure 125. Additional ventilation is provided by slits 35 that are disposed vertically along the length of the body 39.

Figure 12:
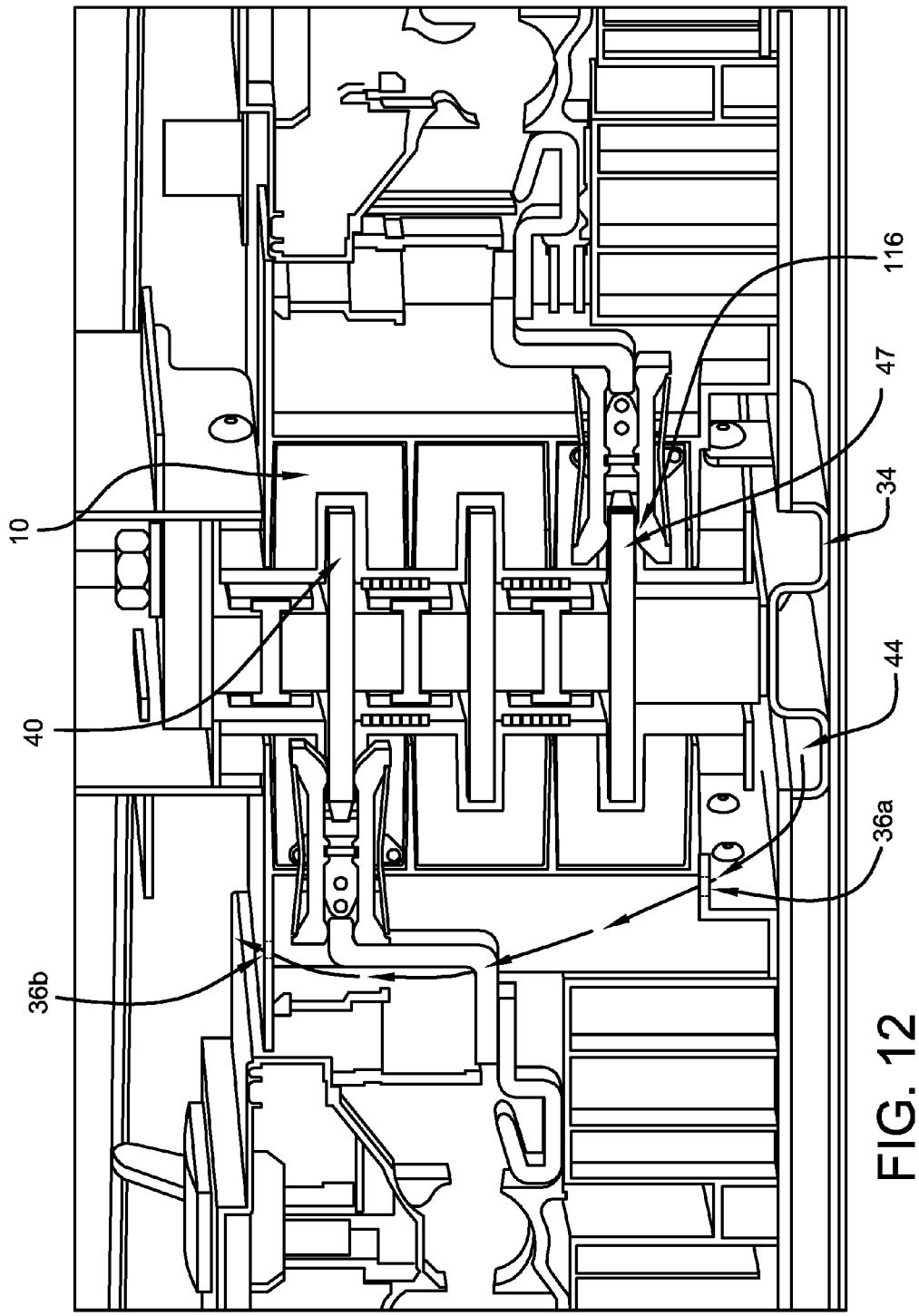
FIG. 12 is a top view of circuit breakers in connection with the bus bar assembly through the shroud.

With reference now to FIG. 12, a top sectional view of the bus bar assembly 45 and attached circuit breakers 30 is shown. The mounting plate 29 has channels 34 that run the vertical length of the bus bar assembly 45. The ventilation path 44 also runs the vertical length of the bus bar assembly 45. The channels 34 may cooperate with ventilation openings 36 in the circuit breakers 30 in the manner depicted in FIG. 12. The warm air generated during operation of the electrical equipment 100 may be dissipated vertically through the channels 35 and then through the first ventilation openings 36a in a first side of the circuit breaker 30 along the line side connector and through the second ventilation openings 36b on the second side of the circuit breaker 30.

While the present application illustrates various embodiments, and while these embodiments have been described in some detail, it is not the intention of the applicant to restrict or in any way limit the scope of the appended claims to such detail. Additional advantages and modifications will readily appear to those skilled in the art. Therefore, the invention, in its broader aspects, is not limited to the specific details, the representative embodiments, and illustrative examples shown and described. Accordingly, departures may be made from such details without departing from the spirit or scope of the applicant's general inventive concept.

What is claimed is:

1. A power distribution apparatus comprising: at least one bus bar including a straight bar portion extending between a top portion of the bus bar and a bottom portion of the bus bar, the straight bar portion having first and second end portions; a first shroud surrounding the first end portion of said at least one bus bar and providing a connection surface for one or more circuit breakers, said first shroud comprising first and second sides, a network of spaced-apart recesses provided in the first side of the shroud, the recesses defining voids when the apparatus is in an assembled state, the voids providing physical access to the first end portion of the straight bar portion at a plurality of spaced apart locations along the first end portion of the straight bar portion, a slot provided in the second side of the shroud, the slot receiving the first end portion of the bus bar in an orientation such that the first end surface is positioned in communication with the network of spaced-apart recesses; and a second shroud for surrounding the second end of said at least one bus bar.

2. The apparatus of claim 1 further comprising a second shroud wherein the first shroud comprises first and second shroud members.

3. The apparatus of claim 2 wherein said first and second shroud members are connected together at opposing longitudinal ends of each shroud member.

4. The apparatus of claim 1 wherein said each of said recesses is equidistantly spaced apart from neighboring ones of the recesses.

5. The apparatus of claim 1 wherein said at least one bus bar is separated from adjacent ones of the at least one bus bar by spacers.

6. The apparatus of claim 1 wherein ribs are disposed vertically along the second side of said shroud, said ribs providing a creepage distance of about 14 mm between adjacent ones of the at least one bus bar.

7. The apparatus of claim 1 wherein said shroud is formed from an aliphatic polyamide.

8. The apparatus of claim 2 wherein each of said first and second shrouds provide at least 12 mm of separation between the live connections of the electrical equipment and an intruding object.

9. A bus bar assembly, comprising: at least one bus bar vertically mounted in an enclosure and retained by a first shroud having a network of spaced apart recesses for providing access to exposed connection surfaces of said at least one bus bar and a second shroud, said at least one bus bar separated from adjacent ones of the at least one bus bar by spacers, said first shroud proving a connection surface for contacts of a circuit breaker, said circuit breaker contacts removeably engageable with said connection surface of said at least one bus bar through corresponding recesses of said shroud; wherein the at least one bus bar includes a straight portion having a height, a width and a length, a side surface extending along the width and the length, and an end surface extending along the height and the length, the end surface having a smaller area than the side surface and a greater area than a third surface extending over the height and the width, the straight portion of the at least one bus bar being inserted into a slot in the first shroud in an orientation such that the end surface is positioned deepest into the slot and the side surface extends outward from the slot.

10. The bus bar assembly of claim 7 wherein said adjacent ones of said at least one bus bar are further separated by spacers.

11. The bus bar assembly of claim 7 wherein a mounting plate is used to mount the bus bar assembly in a rear wall of electrical equipment.

12. A mounting plate for a bus bar assembly, said mounting plate comprising: a main body having a generally rectangular shape, openings disposed proximate to the sides of said main body and channels disposed near side edges of said main body; first tabs extending from side edges of the main body in a direction perpendicular to a front surface of the main body for engaging with the bus bar assembly; and second tabs extending from side edges of the main body in a direction parallel to the front surface of the main body for engaging with a rear wall of the enclosure.

13. A shroud for insulating a bus bar assembly, comprising: a first side having a network of spaced-apart recesses serving as connection surfaces for contacts of one or more circuit breakers and a second side having a plurality of slots receiving corresponding first end portions of the at least one bus bar, said shroud enclosing said at least one bus bar first end except for said connection surface, wherein the bus bar includes a straight portion having a height, a width and a length, a side surface extending along the width and the length, and an end surface extending along the height and the length, the end surface having a smaller area than the side surface and a greater area than a third area defined by the height and the width, the straight portion of the bus bar being positioned farthest into the slot.

14. The shroud of claim 13 wherein said connection surface is located at least 18 mm below the top surface of each recess in the network of spaced apart recesses.

15. The shroud of claim 13 wherein each of said recesses have a horizontally disposed partition and a vertically disposed beveled portion that define cells in each said recess.

16. The shroud of claim 15 wherein two adjacent cells cooperate to form a connection surface for the circuit breaker contacts.

17. The shroud of claim 13 wherein the depth of each recess is about 19 mm as measured between a top planar surface of the shroud and a connection surface of the at least one bus bar.

* * * * *